United States Patent [19]

Auclair

[11] Patent Number: 5,725,185
[45] Date of Patent: Mar. 10, 1998

[54] CABLE CLAMP BRACKET ASSEMBLY

[75] Inventor: William T. Auclair, Winsted, Conn.

[73] Assignee: Electric Motion Company, Inc., Winsted, Conn.

[21] Appl. No.: 608,670

[22] Filed: Feb. 29, 1996

[51] Int. Cl.$^6$ ............................................. F16L 3/08
[52] U.S. Cl. ........................... 248/74.2; 248/74.1; 248/73
[58] Field of Search ................. 248/74.2, 72, 74.1, 248/74.3, 220.21, 229.23, 228.4, 689, 73, 65

[56] References Cited

U.S. PATENT DOCUMENTS

| | | | |
|---|---|---|---|
| 3,154,281 | 10/1964 | Frank | 248/74.2 |
| 3,508,730 | 4/1970 | Knezo, Jr. | 248/74.2 |
| 3,899,149 | 8/1975 | Schneider | 248/74.1 |
| 4,526,333 | 7/1985 | Nakama et al. | 248/74.2 |
| 4,805,479 | 2/1989 | Brightwell | 248/74.2 |
| 4,930,733 | 6/1990 | Logsdon | 248/74.2 |
| 5,024,405 | 6/1991 | McGuire | 248/73 |
| 5,423,501 | 6/1995 | Yu | 248/74.1 |

*Primary Examiner*—Ramon O. Ramirez
*Assistant Examiner*—Willie Berry, Jr.
*Attorney, Agent, or Firm*—Alix, Yale & Ristas, LLP

[57] ABSTRACT

A cable clamp bracket assembly includes a bracket having a base which is mountable to a fixed structure such as the surface of an enclosure and two clamp mounting clips. Each clamp is a compressively self-locking cable clamp having an interior surface for gripping a cable and a portion of the clip. Teeth project upwardly from a conformal bracket seat and engage the cable jacket to provide additional pull-out strength.

20 Claims, 4 Drawing Sheets

CABLE CLAMP BRACKET ASSEMBLY

BACKGROUND OF THE INVENTION

This invention relates generally to clamps for cables. More particularly, the present invention relates to clamps for mounting cables to the surface of an enclosure or the like.

Cables frequently must be routed along surfaces or within enclosures. Unless such cables are mounted to the surface or mounted within the enclosure, they are easily snagged by personnel moving by the surface or entering the enclosure. Cables routed along surfaces exposed to the weather are easily moved by the wind and other environmental forces. Such movement can impose stresses on the cable and may also cause the cable sheath to wear due to frictional engagement with the surface.

Conventional hose clamps have been used to mount cables to surfaces. However, such hose clamps typically employ a metal strap to engage the cable. Improper installation or movement of the cable may cause the edge of the metal strap to cut through the cable jacket, exposing interior cable components to weather, water and humidity. Plastic tie wraps have also been used to mount cables to surfaces. However, tie wraps have limited pull-out strength characteristics and are not readily reusable.

SUMMARY OF THE INVENTION

Briefly stated, the invention in a preferred form is a cable clamp bracket assembly which comprises a bracket mountable to a fixed structure such as the surface of an enclosure and a pair of cable clamps engageable with the bracket to clamp the cable to the bracket.

The bracket is a longitudinally extending member having a middle base portion for mounting to the surface of an enclosure disposed between a pair of clips which retain the clamps. The clips each comprise an inclined portion which extends obliquely outward from the base.

Each cable clamp is preferably a compressively self-locking clamp having overlappable first and second gripping members which are connected by an intermediate section. The first and second gripping members and the intermediate section define an interior surface for receiving the cable and a portion of a clip. Each gripping member comprises first and second fingers wherein the fingers of the first gripping member engage the fingers of the second gripping member to clamp the received cable and clip portion in the cable clamp.

Each clamp clip defines an arc having a radius of curvature from an axis which is parallel to the bracket axis. The radius of curvature is selected to ensure that the first surface of the clip closely conforms to the outer surface of the cable. A plurality of teeth project upwardly from the first surface of each clip. The teeth partially penetrate the cable jacket to provide additional pull-out strength.

An object of the invention is to provide a new and improved cable clamp bracket assembly for mounting a cable to a fixed structure.

Another object of the invention is to provide a new and improved cable clamp bracket assembly which has improved pull-out resistance.

A further object of the invention is to provide a new and improved cable clamp bracket assembly which securely engages with a cable jacket in a non-destructive manner.

Other objects and advantages of the invention will become apparent from the drawings and the specification.

BRIEF DESCRIPTION OF THE DRAWINGS

The present invention may be better understood and its numerous objects and advantages will become apparent to those skilled in the art by reference to the accompanying drawing in which.

DETAILED DESCRIPTION OF THE PREFERRED EMBODIMENT

Figure 1:
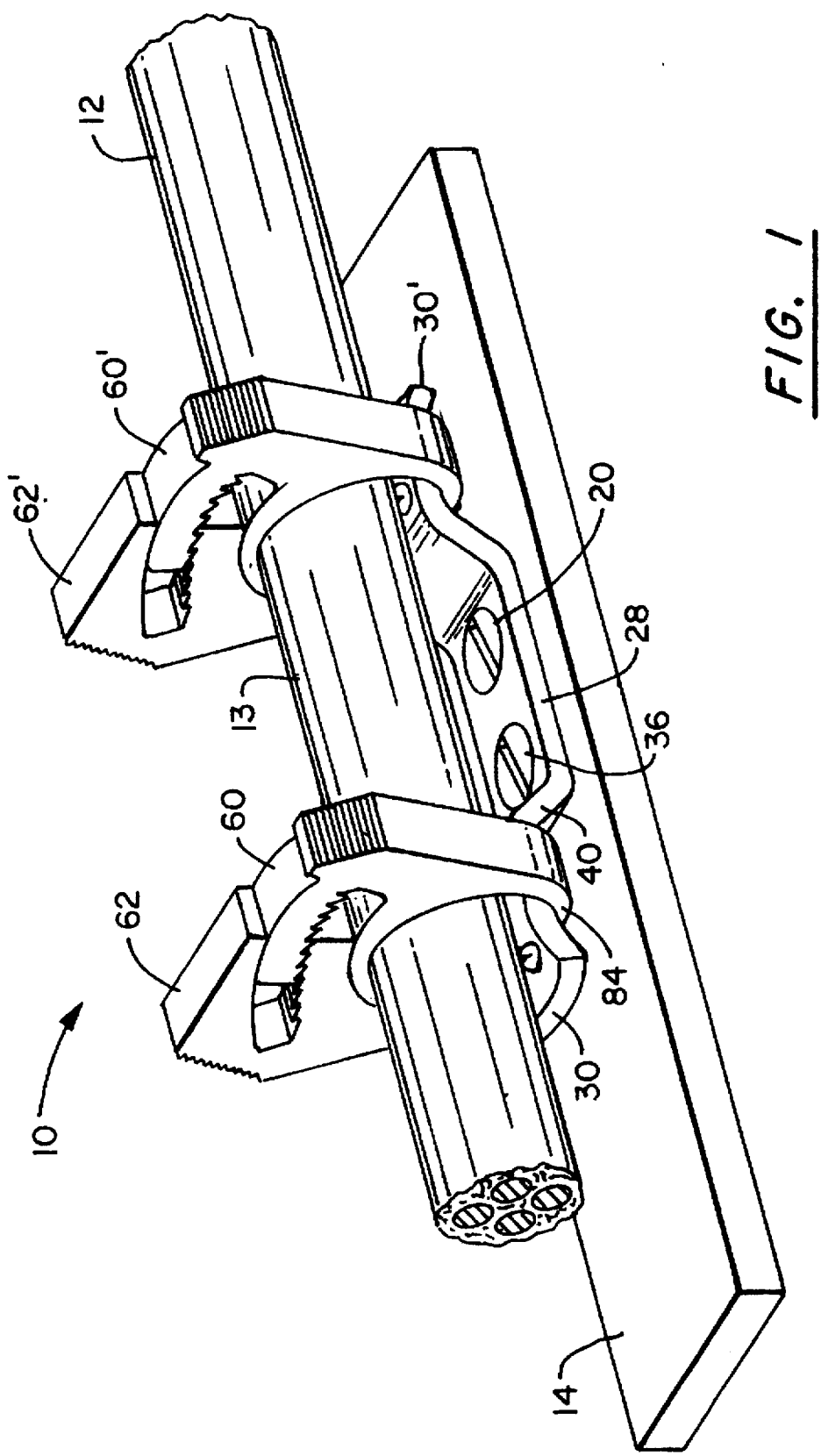
FIG. 1 a perspective view of a cable clamp bracket assembly in accordance with the invention, said clamp bracket assembly mounting a cable to a fixed structure.
Figure 2:
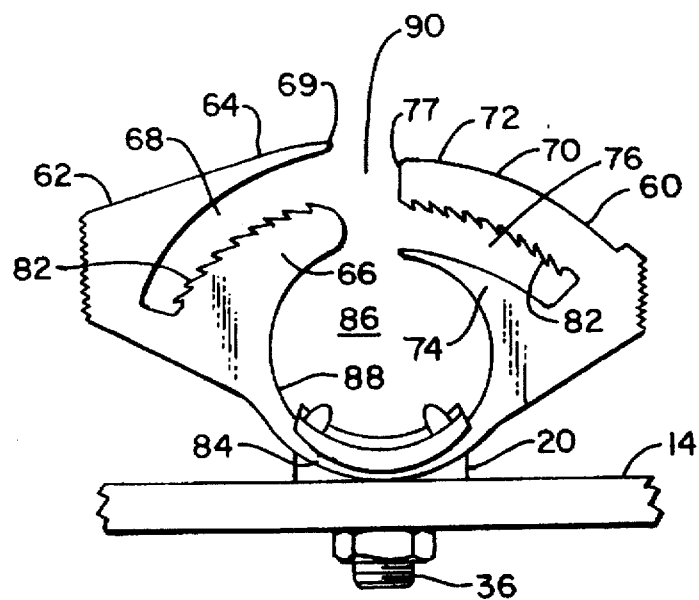
FIG. 2 is an enlarged end view of the cable clamp bracket assembly of FIG. 1 mounted to a fixed structure.

With reference to the drawings wherein like numerals represent like parts throughout the several figures, a cable clamp bracket assembly in accordance with the present invention is generally designated by the numeral 10. The cable clamp bracket assembly 10 comprises a bracket 20 which is mountable to a fixed structure such as the surface 14 of an enclosure and a pair of substantially identical cable clamps 60, 60' which are engageable with the bracket 20 to mount a cable 12 to the bracket 20.

The cable clamp bracket may assume a number of alternate configurations 120, 220 and 320 such as are illustrated in the Figures. Corresponding elements for the alternate embodiments are denoted by three digit numerals comprising identical trailing two digit designations and unique lead digit designations corresponding to the embodiments.

In a preferred embodiment, the bracket 20 is a longitudinally extending member having first and second surfaces 22, 24 and an axis 26. The bracket comprises an intermediate base 28 integrally disposed between first and second clamp clips 30. The base 28 engages the enclosure in surface-to-surface relationship to mount the bracket thereto. Alternatively, a single clip 30 may extend from the base 28. The base 28 has at least one opening 34 for receiving a screw or bolt 36 to mount the bracket 20 to the enclosure surface 14. Preferably, the first surface 22 of the base 28 has a beveled lip 38 around the opening 34 to allow the head of the screw or bolt 36 to be mounted flush to the first surface 22.

Figure 4:
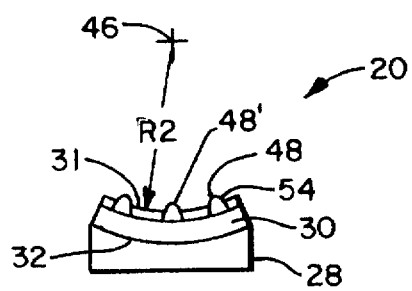
FIG. 4 is an end view of the bracket of FIG. 2.

As shown in FIG. 4, each clip 30 defines an arc having a curvature radius R2 relative to an axis 46 which is parallel to the bracket axis 26, wherein the first surface 22 defines a conformal seat 31 for receiving the cable, and the second surface 24 defines an inverted saddle 32 for locating a cable clamp 60. Radius R2 is selected to ensure that the seat 31 closely conforms to the jacket 13 of the cable 12. For example, the following radii will provide close conformity with commonly used cables: 0.250 inches; 0.375 inches; and 0.516 inches.

Figure 3:
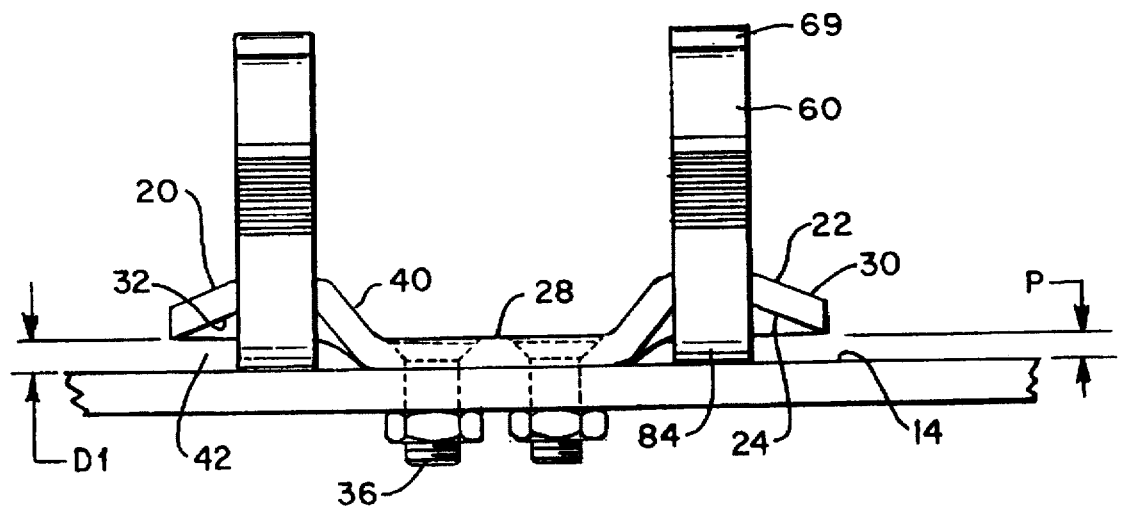
FIG. 3 is a side view of the cable clamp bracket assembly and fixed structure FIG. 2.

Each clip has a proximal inclined portion 40 defining a ramp extending from the base 28 wherein each clip 30 extends obliquely outward from the first surface 22 of the base 28. As shown in FIG. 3, clips 30 are preferably shaped like an inverted saddle 32 when viewed from the side. Alternatively, the inclined portion 40 may extend outwardly from the first surface 22 at a right angle. Upon mounting the bracket, the inclined portions 40 define a space 42 wherein the distance D1 between an intermediate portion of the saddle 32 and the enclosure surface 14 is no more than the thickness T of the intermediate section 84 of the cable clamp 60. The space 42 allows the cable clamp 60 to be assembled to the bracket 20 by sliding the intermediate section 84 between the enclosure surface 14 and the clip 30 of the bracket 20.

Figure 12:
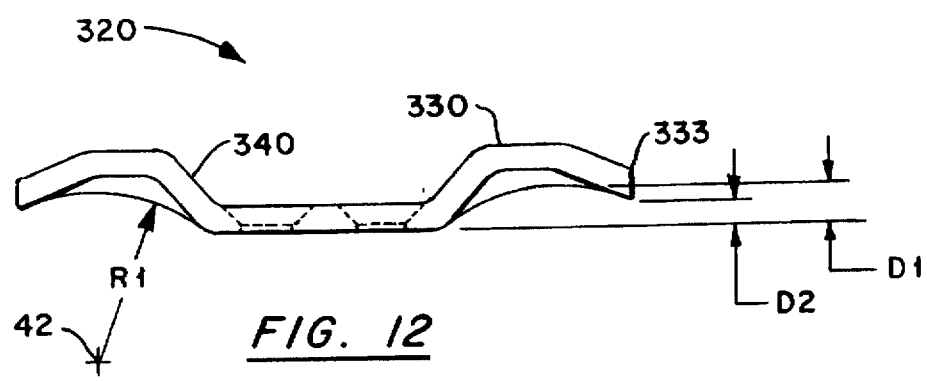
FIG. 12 is a side view of a third alternate embodiment of the bracket of FIG. 2.

In the embodiment shown in FIG. 3, the saddles define a plane P which is substantially parallel to the surface 14 of the enclosure. Alternatively, the clip 330 may substantially extend from the inclined portion 340 in a quasi-arcuate shape having a radius R1 from an axis 44 which is substantially perpendicular to the axis 26 of the bracket 320 (FIG. 12) wherein the distance D2 between the distal end 333 of the clip 330 and the enclosure surface 14 is just slightly more than the thickness T of the intermediate section 84 of the cable clamp 60.

Each cable clamp 60 is assembled to the bracket 320 by inserting the intermediate section 84 between the enclosure surface 14 and a clip 330 of the bracket 320. The intermediate section 84 acts as a wedge to push the distal end 333 of the clip 330 away from the enclosure surface 14 against the spring force of the quasi-arcuate-shaped clip 330. In addition, the intermediate section 84 may elastically deform to allow such passage. The distal end 333 of each clip 330 returns to its original position and the intermediate section 84 returns to its original shape after the intermediate section 84 has been inserted past the distal end 333 to lock each cable clamp 60 in place.

Preferably, the cable clamp 60 is compressively self-locking clamp such as a HEYCO™ hose clamp. Clamps of this type have first and second overlappable gripping members 62, 70 which are connected by an intermediate section 84. Each gripping member 62, 70 comprises respective first and second fingers 64, 72, 66, 74 defining a corresponding slot 68, 76 therebetween. The slots 68, 76 are sized such that the first finger 72 of the second gripping member 70 is receivable in the slot 68 of the first gripping member 62 and the second finger 66 of the first gripping member 62 is receivable in the slot 76 of the second gripping member 70 to facilitate the locking relationship.

The slot face 80 of the first finger 72 of the second gripping member 70 and the slot face 78 of the second finger 66 of the first gripping member 62 have complementary transversely extending sawtooth-shaped ridges 82. The second fingers 66, 74 of the first and second gripping members 62, 70 and the intermediate section 84 form an interior surface 88 for gripping a received cable 12 and a portion of a clip 30 of the bracket 20. The distal end 77 of the second gripping member 70 is radially spaced from the distal end 69 of the first gripping member 62 to define a gap 90. The cable clamp 60 is composed of resilient polymeric material. Therefore, the intermediate section 84 acts as a spring to resist relative movement of the distal ends 69, 77 of the first and second gripping members.

As shown in FIG. 1, the cable clamp bracket 10 comprises two longitudinally spaced cable clamps 60, 60' wherein the intermediate section 84 of each cable clamp 60, 60' is disposed between the enclosure surface 14 and the saddle 32 of the two clips 30. A cable 12 is mounted in the cable clamps 60, 60' by inserting the cable 12 through the gap 90 between the distal ends 69, 77 of the first and second gripping members 62, 70 into the opening 86. Squeezing the first and second gripping members 62, 70 towards each other closes the gap 90. Continued squeezing causes the interior 88 of the intermediate section 84 and the second fingers 66, 74 of the first and second gripping members 62, 70 to engage the intermediate mounting portion of clip 30 and the cable 12, respectively, thereby clamping the cable 12 to the bracket 20. Squeezing the gripping members 62, 70 also causes the first finger 72 of the second gripping member 70 to enter the slot 68 of the first gripping member 62 and the second finger 66 of the first gripping member 62 to enter the slot 76 of the second gripping member 70.

The sawtooth shape of the ridges 82 of the first finger 72 of the second gripping member 70 and the second finger 66 of the first gripping member 62 allows the ridges 82 to slide over each other as the gripping members 62, 70 are squeezed together but prevents movement in the opposite direction, thereby locking the gripping members 62, 70 together. The first finger 64 of the first gripping member 62 and the second finger 74 of the second gripping member 70 limit lateral movement of the first finger 72 of the second gripping member 70 and the second finger 66 of the first gripping member 62 within the slots 68, 76, preventing inadvertent unlocking. The longitudinal space between the cable clamps 60, 60' allows the clamping force to be bifurcated at longitudinally spaced locations of the cable 12.

Figure 5:
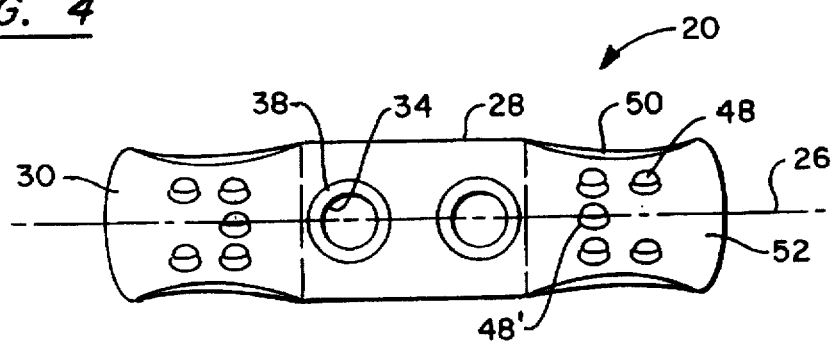
FIG. 5 is a top view of the bracket of FIG. 2.
Figure 6:
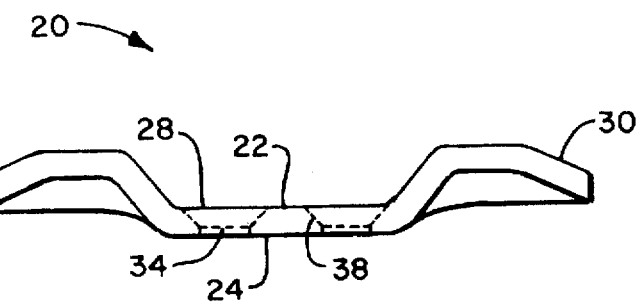
FIG. 6 is a side view of the bracket of FIG. 2.
Figure 7:
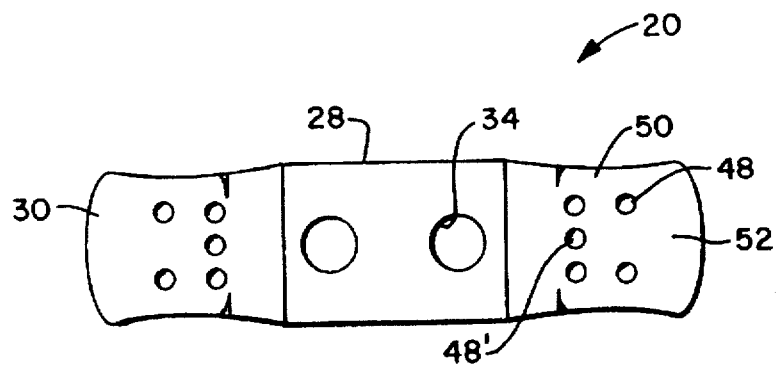
FIG. 7 is a bottom view of the bracket of FIG. 2.
Figure 8:
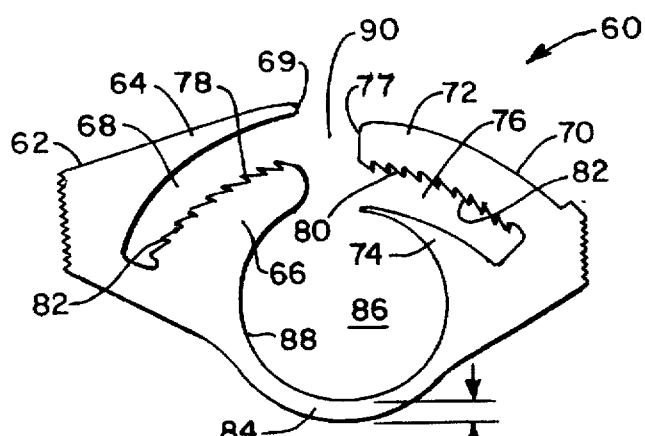
FIG. 8 is an end view of a cable clamp of FIG. 2.
Figure 9:
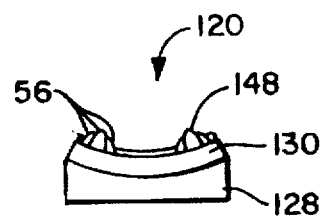
FIG. 9 is an end view of an alternate embodiment of the bracket of FIG. 2.
Figure 10:
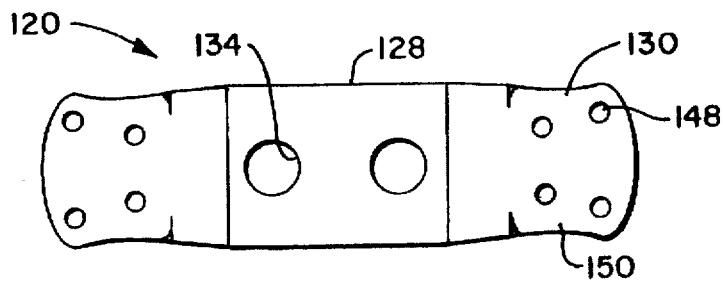
FIG. 10 is a bottom view of the bracket of FIG. 9.
Figure 11:
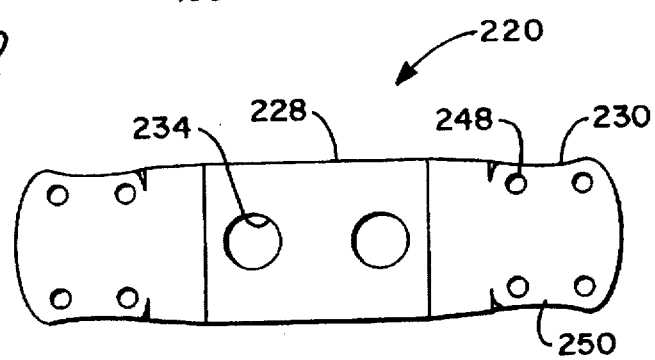
FIG. 11 is a bottom view of a second alternate embodiment of the bracket of FIG. 2.

A plurality of teeth 48 project outwardly from the seat 31. In the embodiments shown in FIGS. 9, 10 and 11, the teeth 148, 248 are disposed in the edge segments 150, 250 of the clamp clips 130, 230. In the embodiment shown in FIGS. 4, 5 and 7, an additional tooth 48' is disposed in middle segment 52 of the clamp clip 30. The teeth 48 may be formed by piercing the bracket 20 and displacing a portion of the bracket 20 outwardly from the first surface 22. In the embodiment shown in FIGS. 4,5 and 7, each tooth 48 comprises a single spur 54 which is formed by flat piercing the bracket 20. In the embodiment shown in FIG. 9, each tooth comprise three spurs 56. The teeth 48 partially penetrate the cable jacket to provide additional pull-out strength.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A cable clamp assembly for mounting a cable to a fixed structure comprising:

bracket means defining a longitudinal axis and comprising a base and first and second clips comprising inverted saddle portions and extending longitudinally from opposite locations of said base; and first and second clamps, each of said clamps being a self-locking hose-type clamp comprising an engagement surface defining an opening for receiving a said inverted saddle portion and the cable, wherein said engagement surface circumferentially clamps said cable to the inverted saddle portion.

2. The cable clamp assembly of claim 1 wherein said base has a planar surface comprising means defining at least one opening.

3. The cable clamp assembly of claim 1 wherein each of said inverted saddle portions comprises an inclined portion and a clamp mounting portion, wherein said inclined portion extends obliquely from said base and said clamp mounting portion extends longitudinally from said inclined portion.

4. The cable clamp assembly of claim 3 wherein each of said clamp mounting portions defines an arc having a radius of curvature relative to an axis which is substantially parallel to said longitudinal axis.

5. The cable clamp assembly of claim 3 wherein each of said clamp mounting portions comprises a seat for conformal engagement with the cable and teeth means extending from said seat.

6. The cable clamp assembly of claim 5 wherein each of said clamp mounting portions comprises oppositely disposed edge portions and wherein said teeth means comprises a plurality of teeth and at least one tooth extends from each of said edge portions.

7. The cable clamp assembly of claim 6 wherein each of said clamp mounting portions further comprises a middle portion intermediate said end portions and wherein at least one tooth extends from each of said middle portions.

8. The cable clamp assembly of claim 3 wherein each of said clamp mounting portions longitudinally extends from said inclined portion in a quasi-arcuate shape having a radius of curvature relative to an axis which is substantially orthogonal to said longitudinal axis.

9. The cable clamp assembly of claim 1 wherein each of said cable clamps extends generally upright relative to said base.

10. The cable clamp assembly of claim 1 wherein said second cable clamp is longitudinally spaced from said first cable clamp.

11. A clamp assembly and cable for mounting to a fixed structure comprising:

a cable having a jacket;

bracket means defining a longitudinal axis and comprising a base, said base having oppositely disposed first and second ends, first and second inclined portions integrally extending obliquely from said first and second ends of said base, respectively, and first and second clamp mounting portions extending longitudinally from said first and second inclined portions, respectively; and first and second clamps, each of said clamps being a hose-type clamp comprising an engagement surface defining an opening for receiving a said clamp mounting portion of said bracket means and said cable, wherein said engagement surface circumferentially clamps said cable to a said clamp mounting portion.

12. The cable clamp assembly of claim 11 wherein each of said clamp mounting portions defines an arc having a radius of curvature relative to an axis which is substantially parallel to said longitudinal axis.

13. The cable clamp assembly of claim 12 wherein each of said clamp mounting portions comprises a seat for conformal engagement with the cable.

14. The cable assembly of claim 13 further comprising a plurality of teeth extending from said seat wherein said teeth partially penetrate said jacket of said cable.

15. The cable clamp assembly of claim 14 wherein each of said clamp mounting portions comprises oppositely disposed edge portions and wherein at least one of said teeth extends from each of said edge portions and partially penetrates said jacket of said cable.

16. The cable clamp assembly of claim 11 wherein each said clamp is composed of polymeric material and has a compressive self-locking mechanism and said second cable clamp is longitudinally spaced from said first cable clamp.

17. In combination:

a cable having a jacket;

a mounting surface;

bracket means defining a longitudinal axis and comprising oppositely disposed first and second surfaces and first and second ends, a base mounted to said mounting surface, first and second clips integrally extending from said first and second ends of said base, respectively, each said clip comprising a clamp mounting saddle portion and a seat portion for receiving said cable; and first and second clamps, each of said clamps being composed of a polymeric material and comprising an engagement surface defining an opening for receiving a said saddle portion of said bracket means and said cable, wherein said engagement surface engages said saddle portion and said cable, whereby said cable is clamped to said saddle portion.

18. The combination of claim 17 wherein each of said seats defines an arc having a radius of curvature relative to an axis which is substantially parallel to said longitudinal axis.

19. The combination of claim 17 further comprising a plurality of teeth extending from said seat, wherein said teeth penetrate said jacket of said cable.

20. The combination of claim 19 wherein each of said seats comprises oppositely disposed edge portions and wherein at least one of said teeth extends from each of said edge portions and penetrates said jacket of said cable.

* * * * *